Jan. 9, 1923.　　　　　O. T. ADAMS.　　　　　1,441,774.
WIND MOTOR.
FILED DEC. 15, 1920.　　　　　4 SHEETS—SHEET 4.
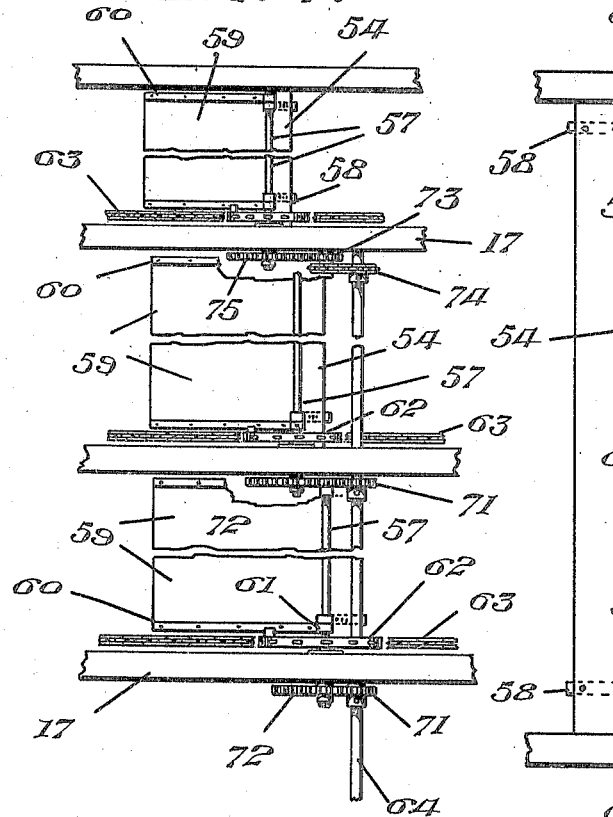
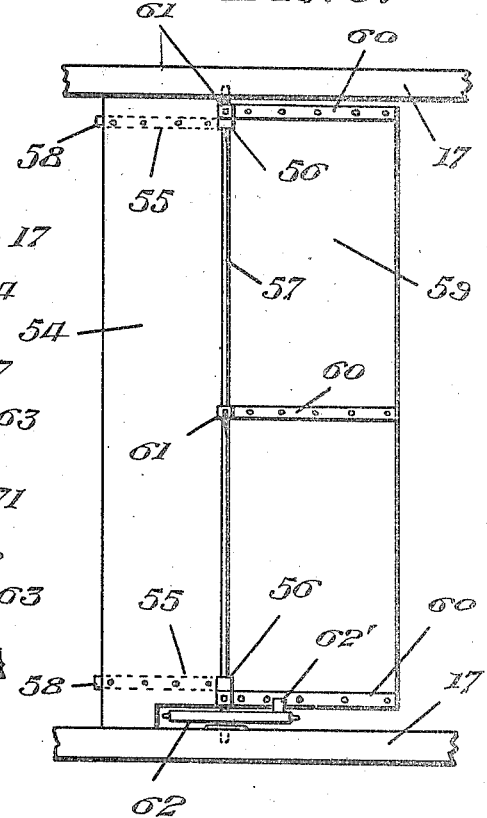
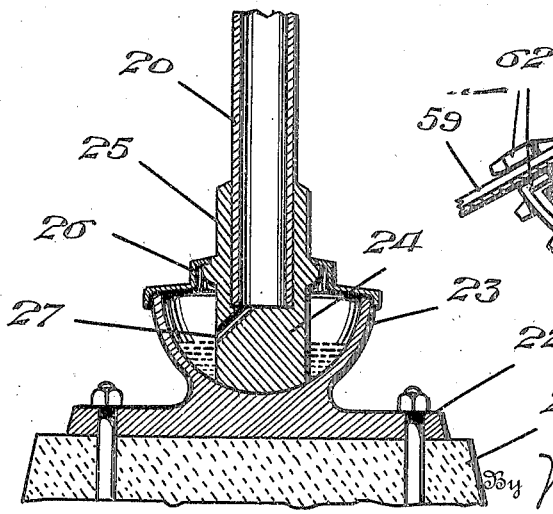
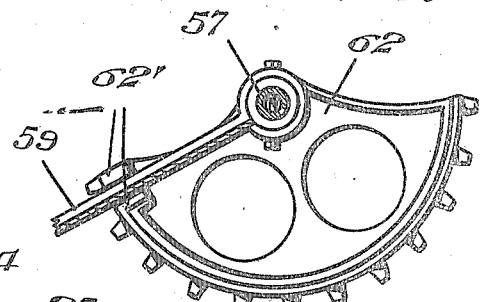
Inventor
O. T. Adams
By W. T. Fitz Gerald & Co.
Attorney Patented Jan. 9, 1923.

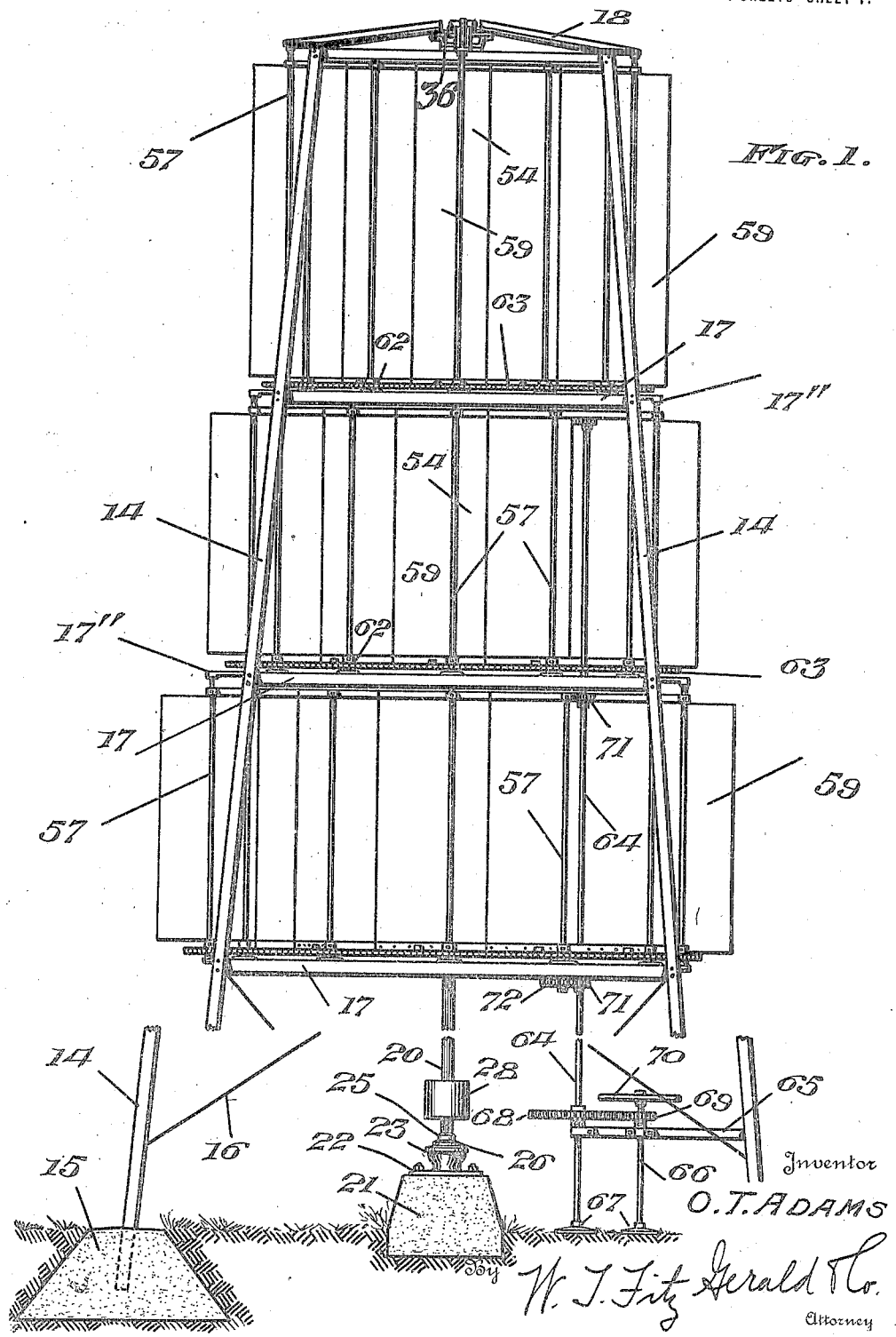

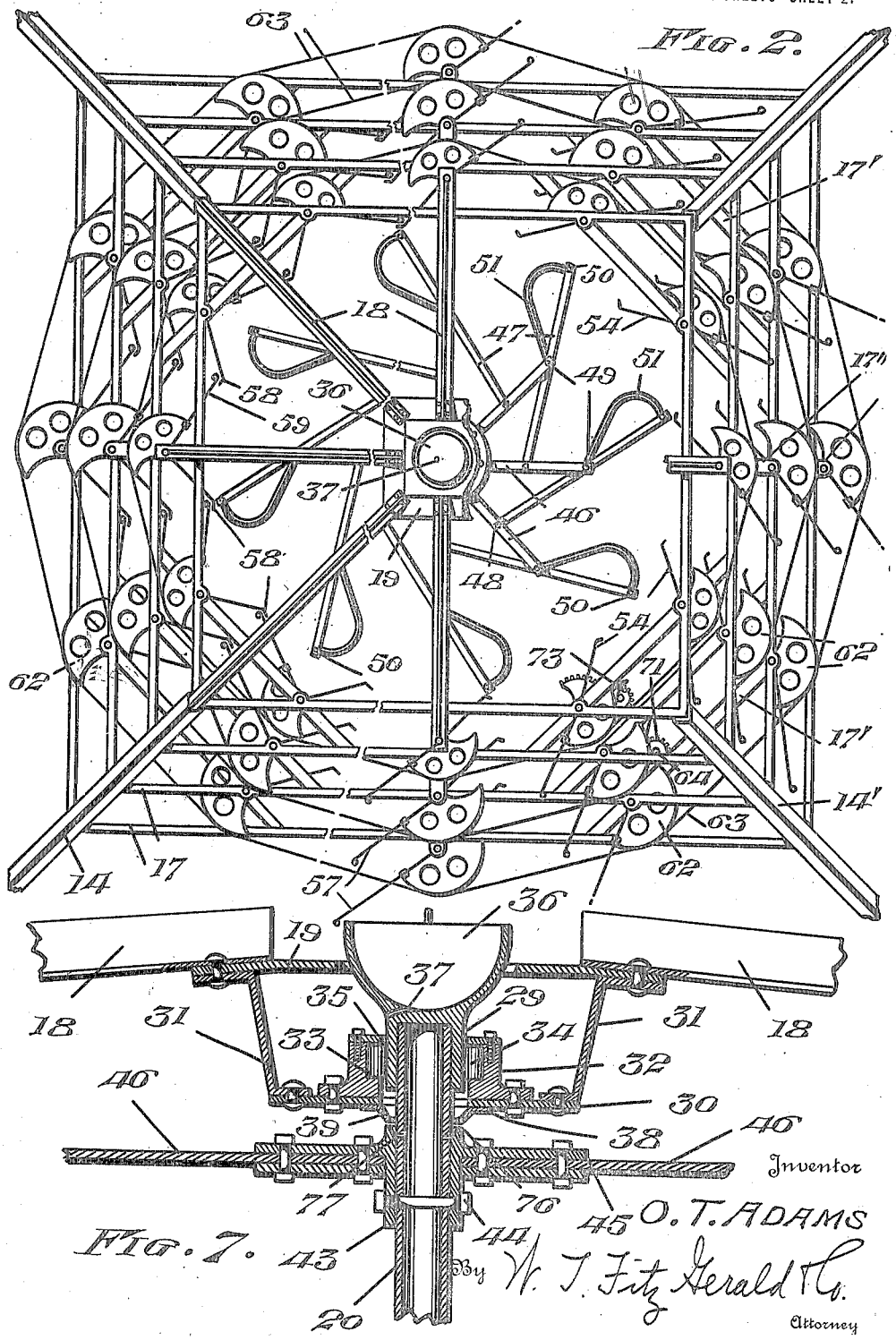

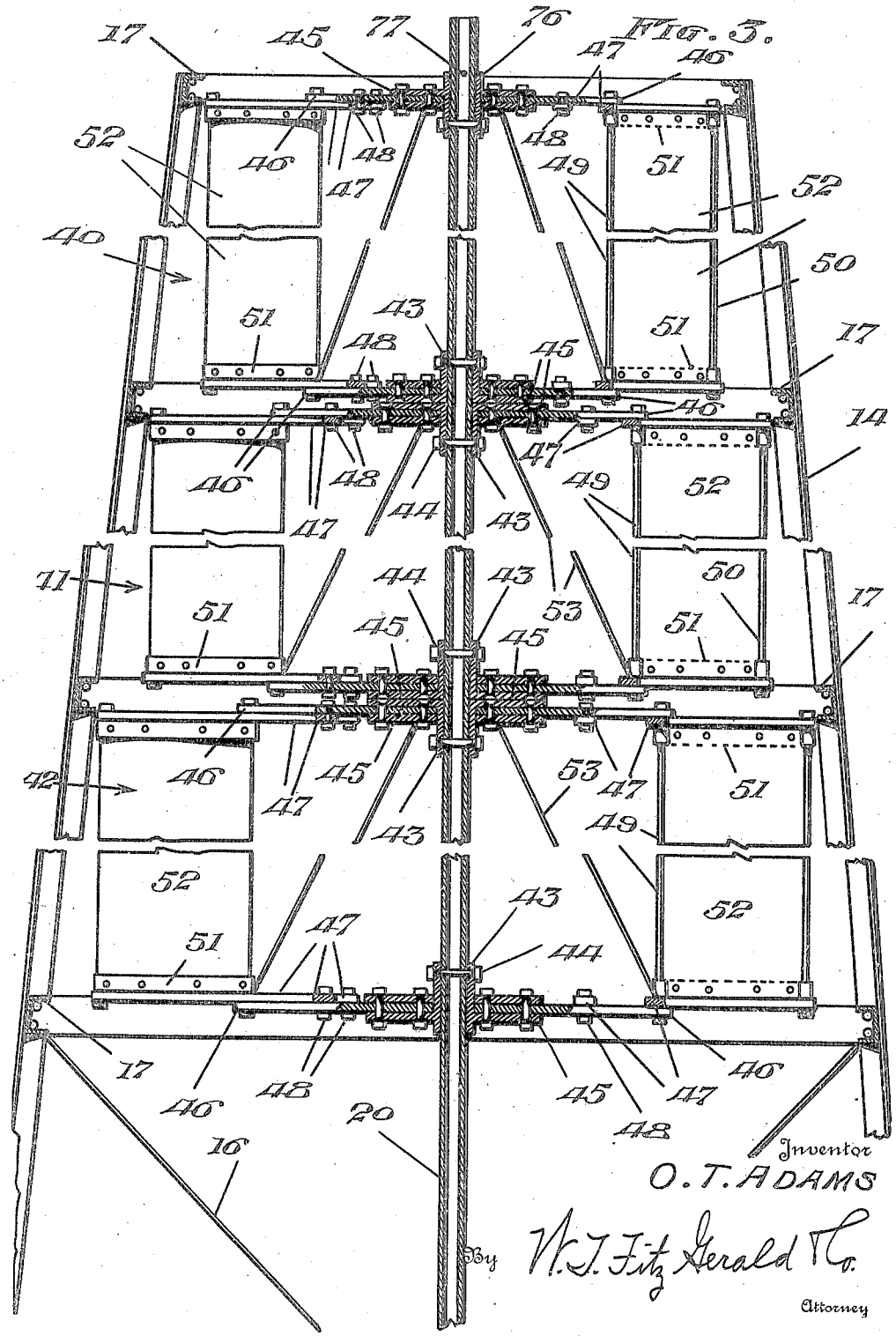

1,441,774

UNITED STATES PATENT OFFICE.

OMER T. ADAMS, OF SAN DIEGO, CALIFORNIA.

WIND MOTOR.

Application filed December 15, 1920. Serial No. 430,884.

*To all whom it may concern:*

Be it known that I, OMER T. ADAMS, a citizen of the United States, residing at San Diego, in the county of San Diego and State of California, have invented certain new and useful Improvements in Wind Motors; and I do hereby declare the following to be a full, clear, and exact description of the invention, such as will enable others skilled in the art to which it appertains to make and use the same.

The present invention relates to a wind mill or motor, and aims to provide a machine of that character of novel and improved construction including a tower, a vertical shaft mounted therein carrying the propeller or wind wheel, and governor means for directing the wind to the propeller in an efficient manner to derive maximum power from the wind.

Another object is the provision of a propeller or wind wheel of novel construction to serve its purpose in an efficient manner.

A further object is the provision of a novel and improved governor construction constructed and operable for directing air currents to the propeller or wind wheel from any direction to obtain maximum power, and to control the flow of air to regulate the power obtained.

A still further object is to provide a wind motor comprising superposed propeller sections and governors for the air current, which propeller sections and governors are of increasing sizes from the upper ones downward, in order to provide a compact and light construction, which can be built at minimum expense to obtain the desired power, and which structure is also more able to withstand high winds and cyclones.

Another object of the invention is the provision of novel means for mounting the vertical shaft of the propeller and for supplying lubricant to the bearings thereof.

With the foregoing and other objects in view, which will be apparent as the description proceeds, the invention resides in the construction and arrangement of parts hereinafter described and claimed, it being understood that changes can be made within the scope of what is claimed without departing from the spirit of the invention.

The invention is illustrated in the accompanying drawings, wherein:—

Figure 1 is a side elevation of the wind motor, portions being broken away.

Fig. 2 is a plan view of the construction, somewhat diagrammatical and portions being broken away, the wings at the right hand side of the break being open and those at the left hand side of the break being closed.

Fig. 3 is a vertical section of the propeller or wind wheel, portions being broken away and removed for sake of clearness.

Fig. 4 is an elevation of the operative connections between the governors and governor control shaft, portions being broken away.

Fig. 5 is an elevation showing the mounting of one pair of governor wings or vanes.

Fig. 6 is an enlarged plan view of one of the sprocket segments.

Fig. 7 is an enlarged diametrical section through the bearing for the upper end of the propeller shaft.

Fig. 8 is an enlarged diametrical section through the step bearing for the lower end of the propeller shaft.

In carrying out the invention, there is provided a skeleton tower frame, which is of square outline as shown, although the tower can be built in various shapes, and comprises the inclined corner posts 14 which converge upwardly, whereby the tower tapers or decreases in size from the base to the upper end, to give the frame strength against the wind pressure. The tower frame is mounted on a suitable base, and, as shown, the lower ends of the posts 14 are embedded in concrete sleepers 15, one for each post. The posts 14 are connected by horizontal cross pieces 17, and the structure is made rigid by means of diagonal braces or ties 16. At the upper end of the frame, the frame is provided with the inclined top pieces or rafters 18 secured to the upper ends of the posts 14 and the upper-most cross pieces 17 and converging toward the vertical center of the tower, with their inner ends secured to a cap plate 19, for the attachment for a suitable roof on said rafters.

Located centrally within the tower frame is a vertical propeller shaft 20 carrying the propeller or wind wheel as hereinafter described, and the lower end of said shaft is supported for rotation by a step bearing. As shown in Fig. 8, said step bearing is mounted on a concrete sleeper or base 21, and said bearing includes a plate 22 secured on the sleeper 21 and having a bowl 23 thereon in which a pivot member 24 is seated for rotation, said member having a sleeve or socket 25 in which the lower end of the shaft 20 is fitted. The bowl 23 can hold oil for lubricating the spherical contacting surfaces of the bowl and pivot member, and the lower end of the shaft 20 thus finds its own center in the bowl, and said bowl supports the weight of the propeller shaft and propeller carried thereby. An annular cover 26 is preferably fitted on the member 24 and rim of the bowl, to exclude dust and dirt from the bowl, and the member 24 has a drain duct 27 leading from the lower end of the shaft 20 whereby the lubricant which drains down the shaft 20 from the upper end thereof, as will hereinafter more fully appear, will pass into the bowl 23 thereby conserving the lubricant. The power is taken or transmitted from the shaft 20, such as by means of a pulley wheel 28 secured to the shaft near its lower end.

The bearing for the upper end of the shaft 20 (shown in detail in Fig. 7) includes a cap or sleeve 29 fitted on the upper end of the shaft, and an annular horizontal plate 30 surrounds said shaft immediately below the sleeve 29, and is suspended from the cap plate 19 of the frame by means of hangers 31. An annular bearing member 32 is secured on the plate 30 and has an inner annular recess or race 33 in which anti-friction rollers 34 travel, and the sleeve 29 contacts with said rollers to pivot the upper end of the shaft 20 for free rotation. A ring 35 is secured on the upper edge of the bearing member 32 to overlap the rollers 34 and retain them in the recess 33. Lubricant is supplied to the bearing by means of a lubricant bowl 36 on the sleeve or cap 29, and having a drain duct 37 leading to one side of the sleeve 29, so that the lubricant can flow slowly down the side of the sleeve to lubricate the rollers 34. In order to conserve the lubricant which runs down from the bearing, a ring 38 is secured to the lower surface of the plate 30 around the shaft, and has an annular sloping drain flange 39 for catching the lubricant and directing it inwardly to run or drip from the inner edge of said flange adjacent to the shaft 20, whereby to run down the shaft, as hereinafter pointed out.

The propeller or wind wheel is mounted on the shaft 20 within the upper portion of the tower frame and includes a plurality of superposed sections 40, 41 and 42 as most clearly seen in Fig. 3, although any number of sections can be used from one up, within practical limits. The use of superposed sections is advantageous, however, as over a single section for the power desired, because the propeller and other structure can be built within the smallest possible outline and of upwardly-tapered form, in order to withstand heavy winds and cyclones, and to provide for economy in costruction and other advatages, as compared with a single section propeller of larger proportions to obtain the same power. However, aside from the duplication of the propeller sections, the other features of the construction can be used for a single section propeller, and are not restricted, further than necessary, to a multi-section propeller. The superposed propeller sections 40, 41 and 42 are of increasing diameter or outline from the upper one downward, whereby the propeller is of upwardly-tapered or stepped form, corresponding with the tower frame, and the sections 40, 41 and 42 are of similar construction. Each section includes the upper and lower hubs 43 secured, as at 44, to the shaft 20, and said hubs have the horizontal flanges 45 to which radial spokes 46 are secured. Oblique bars or arms 47 are secured between their ends to the outer ends of the spokes 46 at the upper and lower ends of the section, and the inner ends of said bars 47 are secured to the spokes 46 in rear, as at 48, between the ends of the spokes 46, thereby supporting the bars 47 in oblique position, with their outer end portions projecting beyond the spokes 46, to carry blades or buckets. Vertical rods 49 are engaged through the spokes 46 and bars 47 to secure them together at the upper and lower ends of the propeller sections, and similar vertical rods 50 are engaged at their upper and lower ends with the bars 47 at the outer ends of said bars. Curved end bars 51 have their ends embracing the rods 49 and 50. The propeller blades or buckets 52 are curved transversely, and are disposed in vertical positions with their ends secured to the bars 51, thereby securing said blades or buckets to the bars 47 and spokes 48. The blades being concaved transversely in the form of buckets will catch the wind better, and thus increase the power derived from the wind. As shown, the propeller rotates counter clockwise in Fig. 2. It is preferable to increase the number of blades or buckets for the sections of the propeller from the upper section downward, whereby to avoid dead centers. Thus, as shown in Fig. 2, the upper section has eight blades, and the next section 41 may have nine blades, and the lower section 42 ten blades, so that one blade or bucket of one section will always be in position to receive the direct pressure of the wind, and the increasing number of blades for the propeller sections from the upper one downward is also natural and in harmony with the increasing diameters of said sections from the upper one downward. It is preferable to connect the lower bars and spokes of each propeller section with the upper hub, by means of inclined braces or stays 53 to avoid the propeller section from sagging under the weight of the blades or buckets.

Each propeller section is provided with a surrounding governor for controlling the flow of air currents to and from the propeller, and these governors for the propeller sections are of corresponding diameter or outline and increase in size from the upper one downward according to the propeller sections. Each governor includes an annular series or set of vertical air-deflecting wings or vanes 54 disposed in oblique positions in plan, with their inner edges so arranged that the outer edges of the blades or buckets 52 pass close to said edges of the wings so that the air is directed effectively into the blades or buckets. Each wing 54 is rigidly secured to the frame and to transverse straps 55 which have the hinge butts 56 loosely embracing the vertical shaft 57 journaled at its upper and lower ends in the frame. There is one shaft 57 for each wing 54 and said shafts 57 are journaled in the cross pieces 17, diagonal corner braces 17' or outstanding brackets 17'' of the frame. The inner ends of the straps 55 project beyond the inner edges of the wings 54 and are bent to form stops 58 for outer adjustable deflecting wings or vanes 59, one of said wings 59 being provided for each wing 54, and the wings being arranged in pairs around the propeller. Each wing 59 is secured to transverse straps 60 which have hinge butts 61 embracing and secured to the corresponding vertical shafts 57, and the wings 54 extend inwardly from said shafts while the wings 59 extend outwardly to catch the air and direct same to the wings 54 which direct the air to the propeller blades.

In order to turn all of the wings 59 of each set simultaneously, a sprocket segment 62 is secured to each shaft 57 below the lower end of the wing 59, and has a pair of upstanding lugs 62' between which the lower strap 60 and lower end of the wing 59 extend, whereby to compel said wing 59 to turn with the sprocket segment, and an endless sprocket chain 63 is trained around each annular set or series of segments 62, whereby the shafts 57 of each set turn simultaneously. The wings 59 when swung inwardly will contact at their free edges with the stops 58, and the wings 59 will thus close the spaces between the stationary wings 54, whereas the wings 59 when swung outwardly will catch the air and direct same inwardly from any direction.

The several superposed governors are controlled and operated simultaneously by a vertical governor control shaft 64 within the tower and journaled suitably in the frame and within a bracket 65 at the lower end of the frame. A lower hand wheel shaft 66 is also journaled in the bracket 65, and the shafts 64 and 66 are seated in step bearings 67. A gear wheel 68 secured to the shaft 64 meshes with a pinion 69 on the shaft 66, and a hand wheel 70 on the upper end of the shaft 66 enables the shaft 64 to be rotated conveniently. The control shaft 64 is operatively connected with one shaft 57 of each governors, and such shafts 57 of the intermediate and lower governors have gears 72 secured to the lower ends thereof meshing with gears 71 secured to the shaft 64, whereas the upper shaft 57, which is further away from the shaft 64, is operated by a gear 73 connected by a sprocket chain 74 with the shaft 64 to turn in the same direction, and the gear 73 meshes with a gear 75 secured to the lower end of such upper shaft 57. Therefore, by turning the shaft 64 one shaft 57 of each governor is turned and through the segments 62 and sprocket chains 63, all of the wings 57 are turned simultaneously. Such wings can therefore be set according to the direction and velocity of the wind to obtain the greatest benefit and power from the air current, and to regulate the power.

The upper hub 43 of the upper propeller section has its upper end provided with an inner annular bevel 76 for catching the lubricant from the drip flange 39, and the shaft 20 has one or more apertures 77 for the flow of the lubricant inwardly from the upper recessed end of the hub 43 into the shaft. The lubricant is thus conserved, inasmuch as the lubricant which drains from the upper bearing flows downwardly within the shaft to the lower bearings.

With the provision of the wings 54 and 57 for deflecting and directing the air current, greatest power is obtained without back pressure on the propeller, and the air is directed around one side of the propeller, and out, while the wings 59 can be swung to close off the air from the propeller more or less to regulate the speed and power obtained.

Having thus described the invention, what is claimed as new is:—

1. A wind motor comprising a propeller rotatable about a vertical axis, a frame in which said propeller is rotatable, an annular series of vertical shafts mounted in the frame around the propeller, wings having portions embracing said shafts and adapted to be turned to different positions, members mounted on said shafts at some of the ends of said wings, said members and corresponding ends of the wings having portions fitted together removably for moving the wings with said members, and operating means connected to said members for turning them simultaneously.

2. A wind motor comprising a frame, a propeller rotatable about a vertical axis in said frame, an annular series of vertical shafts mounted in the frame around said propeller, wings secured to the frame and extending inwardly from said shafts toward the propeller, said wings having portions embracing said shafts at the outer edges of said wings, other wings having portions embracing said shafts and adapted to be turned to different positions, members on the shafts below the lower ends of said wings, said members having upstanding lugs between which the last named wings are removably engaged, and operating means connected to said members for turning them simultaneously.

3. A wind motor comprising a tower frame, a vertical shaft mounted for rotation within said frame, a propeller mounted on the shaft within the frame including superposed sections of increasing diameters from the upper section downward, a governor for the air current surrounding each propeller section and including vertical shafts mounted in the frame around the corresponding propeller section, the governor including wings having portions embracing the shafts, some of the wings extending inwardly from the shafts and being secured to the frame, the other wings being adapted to be turned to different positions and projecting away from the first named wings, the shafts of the governors from the upper governor downward being spaced increasing distances from the propeller shaft and sections, means connecting the last named wings of each governor for the simultaneous movement of said wings, and operating means for turning the last named wings of the governors.

4. A wind motor comprising a tower frame, a vertical shaft mounted for rotation within said frame, a propeller mounted on the shaft within the frame including superposed sections of increasing diameters from the upper section downward, a governor for the air current surrounding each propeller section and including vertical shafts mounted in the frame around the corresponding propeller section, the governor including wings having portions embracing the shafts, some of the wings extending inwardly from the shafts and being secured to the frame, the other wings being adapted to be turned to different positions and projecting away from the first named wings, the shafts of the governors from the upper governor downward being spaced increasing distances from the propeller shaft and sections, means connecting the last named wings of each governor for the simultaneous movement of said wings, a vertical shaft mounted in the frame, and an operative connection between said last named vertical shaft and one shaft of each governor for simultaneously operating the last named wings of all governors.

5. A wind motor comprising a tower frame, a vertical shaft located therein, a propeller carried by said shaft, a bearing for the upper end of said shaft carried by the frame, means for supplying lubricant to said bearing, a step bearing for the lower end of said shaft, said shaft being tubular and having means for receiving lubricant drained from the first named bearing so as to convey the lubricant to the step bearing.

6. A wind motor comprising a tower frame, a tubular vertical shaft located within said frame, a propeller carried by said shaft, a cap on the upper end of said shaft, a bearing carried by the frame in which said cap is rotatable, a bowl carried by said cap and having a drain duct for the flow of lubricant down said cap into said bearing, said shaft having an aperture, means for catching lubricant drained from said bearing and directing it through said aperture to drain down the shaft, and a step bearing for the lower end of the shaft including a bowl for holding lubricant and in which the lower end of the shaft is pivotally supported to receive lubricant from the lower end of said shaft.

7. A wind motor comprising a shaft, a propeller including hubs secured to said shaft, sets of spokes extending radially from said hubs, sets of oblique bars secured to said spokes and projecting beyond the ends of said spokes, rods connecting the spokes and bars of the sets, and blades connected to said rods and the projecting portions of the bars beyond the ends of the spokes.

In testimony whereof I have signed my name to this specification in the presence of two subscribing witnesses.

OMER T. ADAMS.

Witnesses:
RALPH P. HENDERSON,
M. W. MASON.